United States Patent
Mustafi et al.

(10) Patent No.: US 10,489,229 B2
(45) Date of Patent: Nov. 26, 2019

(54) ANALYZING COMPUTING SYSTEM LOGS TO PREDICT EVENTS WITH THE COMPUTING SYSTEM

(71) Applicant: International Business Machines Corporation, Armonk, NY (US)

(72) Inventors: Joy Mustafi, Kolkata (IN); Vishnuteja Nanduri, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 168 days.

(21) Appl. No.: 15/055,970

(22) Filed: Feb. 29, 2016

(65) Prior Publication Data

US 2017/0249200 A1    Aug. 31, 2017

(51) Int. Cl.
G06F 11/00 (2006.01)
G06F 11/07 (2006.01)

(52) U.S. Cl.
CPC ........ *G06F 11/076* (2013.01); *G06F 11/0709* (2013.01)

(58) Field of Classification Search
CPC .. G06F 11/079; G06F 11/0709; G06F 11/076; G06F 11/0772; G06F 11/0793
See application file for complete search history.

(56) References Cited

U.S. PATENT DOCUMENTS

| | | | |
|---|---|---|---|
| 6,353,902 B1 * | 3/2002 | Kulatunge | H04L 41/06 714/47.3 |
| 6,771,440 B2 | 8/2004 | Smith | |
| 7,730,364 B2 | 6/2010 | Chang et al. | |
| 8,078,556 B2 | 12/2011 | Adi et al. | |
| 8,429,146 B2 | 4/2013 | Shen et al. | |

(Continued)

FOREIGN PATENT DOCUMENTS

| | | |
|---|---|---|
| WO | 2014043623 A1 | 3/2014 |
| WO | 2015016920 A1 | 2/2015 |

OTHER PUBLICATIONS

"DB2 10—Messages—DSNW133I", IBM Knowledge Center, Printed Dec. 31, 2015 9:53 AM, 1 page, <http://www-01.ibm.com/support/knowledgecenter/api/content/nl/en-us/SSEPEK_10.0.0/com.ibm.db2z10.doc.msgs/src/tpc/dsnw133i.dita>.

(Continued)

*Primary Examiner* — Jason B Bryan
(74) *Attorney, Agent, or Firm* — Daniel R. Simek

(57) ABSTRACT

A method for analyzing data of a networked computing environment, the method includes a computer processor analyzing a plurality of data of a networked computing environment aggregated during a first time interval, where the data includes messages that include message IDs. The method further includes identifying a frequency value of occurrences of a message ID within the plurality of data during the first time interval. The method further includes determining whether the frequency value of the occurrences of the message ID during the first time interval correlates to an anomaly that occurs within the networked computing environment. The method further includes responding to determining that the frequency value of the occurrences of message ID within the first time interval correlates to the anomaly by determining a first response to the anomaly. The method further includes initiating the first response to one or more elements of the networked computing environment.

14 Claims, 6 Drawing Sheets

(56) References Cited

U.S. PATENT DOCUMENTS

| | | | |
|---|---|---|---|
| 8,495,429 B2 | 7/2013 | Fu et al. | |
| 8,832,125 B2 | 9/2014 | Boctor | |
| 2004/0268189 A1* | 12/2004 | Constantinescu | G06F 11/008 714/704 |
| 2006/0010352 A1* | 1/2006 | Mukherjee | G06F 11/0724 714/47.2 |
| 2010/0083029 A1* | 4/2010 | Erickson | G06F 11/0709 714/2 |
| 2010/0180274 A1* | 7/2010 | Cherian | G06F 9/45558 718/1 |
| 2013/0159787 A1* | 6/2013 | Yingling, Jr. | G06F 11/008 714/47.3 |
| 2014/0053025 A1 | 2/2014 | Marvasti et al. | |
| 2014/0067773 A1 | 3/2014 | Urmanov et al. | |
| 2014/0304390 A1 | 10/2014 | Bates | |

OTHER PUBLICATIONS

"IBM IT operations analytics", IBM Software, Printed Dec. 31, 2015 9:07 AM, 2 pages, <http://www-03.ibm.com/software/products/en/category/it-operations-analytics>.

"Logstash: Collect, Parse, Transform Logs", Elastic, Printed Dec. 31, 2015 9:08 AM, 2 pages, <https://www.elastic.co/products/logstash>.

"Splunk", Splunk, Printed Dec. 31, 2015 9:13 AM, 6 pages, <http://www.splunk.com/>.

"Sumologic", Sumologic, Printed Dec. 31, 2015 11:20 AM, 5 pages, <https://www.sumologic.com/>.

"IBM Predictive Maintenance and Quality (Version 2.0)", IBM Redbooks Solution Guide, 12 pages, printed Feb. 25, 2016.

* cited by examiner

ANALYZING COMPUTING SYSTEM LOGS TO PREDICT EVENTS WITH THE COMPUTING SYSTEM

BACKGROUND OF THE INVENTION

The present invention relates generally to the field of IT infrastructure management, and more particularly with analyzing system log files of a networked computing environment.

Information technology (IT) infrastructures have increased in complexity from a few mainframe computers and individual servers to networked computing systems comprised of rack-mounted blade servers and storage devices, such as the equipment in a computing center; to distributed architectures, such as a networked computing environment and a cloud computing system. The volume, complexity, and diversity of data within IT systems have increased; additionally, the speed of operation of the IT systems also increased. Included in the data increase are records of activity and transactions within the IT system, and the records can be stored, for example, as entries within log files. Log files can identify actions and events within an IT infrastructure, such as identifying the consumption of system resources utilized during the execution of software programs of a user, activities of administrators of the IT system, and the data generated by monitoring the IT system. The information within log files (e.g., message logs) is utilized by personnel that support an IT system to diagnose hardware and software problems within the IT system.

SUMMARY

According to aspects of the present invention, there is a method, computer program product, and/or system for analyzing data of a networked computing environment. The method comprising one or more processors executing the step of analyzing a first plurality of data of a networked computing environment aggregated during a first time interval, wherein data of the networked computing environment includes messages that include message identifiers (IDs). The method further includes one or more processors executing the step of identifying a frequency value of occurrences of a message ID within the analyzed first plurality of data during the first time interval. The method further includes one or more processors executing the step of determining whether the frequency value of the occurrences of the message ID during the first time interval correlates to an anomaly that occurs within the networked computing environment. The method further includes one or more processors executing the step of responding to determination that the frequency value of the occurrences of message ID within the first time interval correlates to the anomaly by determining a first response to the anomaly. The method further includes one or more processors executing the step of initiating the determined first response to one or more elements of the networked computing environment.

DETAILED DESCRIPTION

Figure 1:
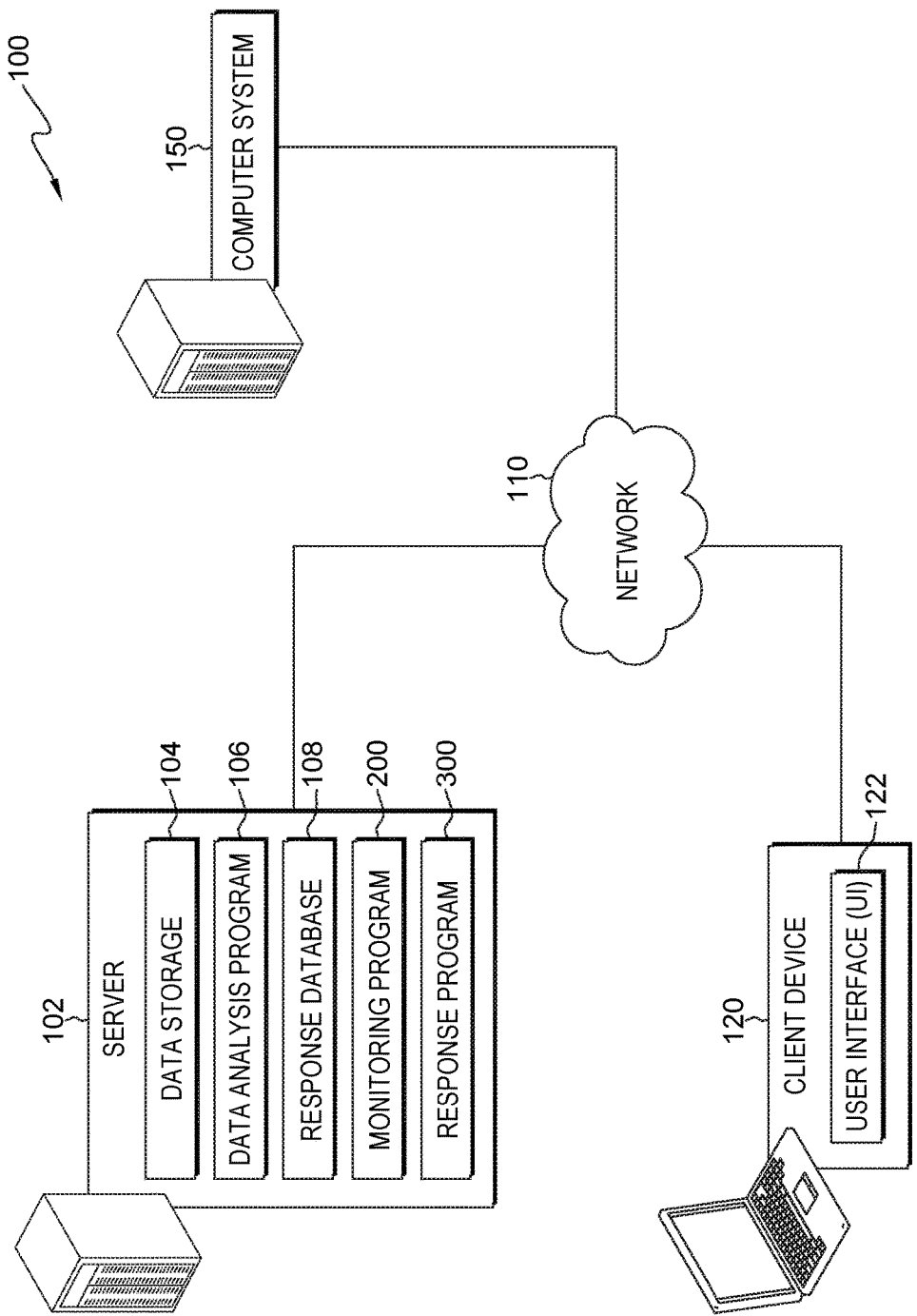
FIG. 1 functional block diagram illustrating a networked computing environment, in accordance with an embodiment of the present invention.

Embodiments of the present invention recognize that users that support an IT infrastructure utilize monitoring data to identify and correct events within the support IT infrastructure. System events, herein identified as events, include: hardware failures, software failures, and degradation of performance of executing workloads of users. Embodiments of the present invention also recognize that an IT infrastructure includes elements, such as processing systems, storage systems, and networking systems. One example of an IT infrastructure is a networked computing environment. Data output for monitoring an element of an IT infrastructure and/or software executing within the IT infrastructure include information, such as, but not limited to, system logs, log files, messages that identify transactions, messages that include state data associated with a hardware element, and messages associated with the activities of executing software, etc. Embodiments of the present invention recognize that various parsing and data analysis programs are commercially available; however, manual intervention by one or more users is utilized: to select analysis intervals, to study tables and graphs of the analyzed data, and to make and implement decisions.

Embodiments of the present invention utilize monitoring data, such as log files to identify anomalies within an IT infrastructure that are precursors to system events. Anomalies within an IT infrastructure can be associated with hardware and/or software issues, such as server failures and applications that do not properly release provisioned memory. Anomalies within an IT infrastructure include: excessive resource utilization, increased transmission errors, communication bandwidth reductions, excessive variability in job execution durations, application failures, and improperly isolated system maintenance. Some anomalies can be identified as deviations of one or more system or response metrics, such as metrics of a service level agreement for a customer and increased effort of system administrators. Other anomalies within an IT infrastructure can be security-related, such as effects of malicious code and intrusion attempts.

Embodiments of the present invention utilize historical system (e.g., log files) data and historical actions of users to system events to automate the identification of system data that precede an event, determining and correlating interactions of the system data that precede an event, and determining one or more responses to the system data that precede an event. The automation of manual user actions can improve detection of anomalies, reduce response time to anomalies by providing an early warning, and determine one or more responses to the detected anomalies thus reducing costs and improving customer satisfaction by mitigating or eliminating events within an IT infrastructure.

Embodiments of the present invention obtain monitoring data, such as message information from a plurality of sources within a networked computing environment. The information sources can include: log files from a hardware system, such as a network controller; messages from operating systems, such as a hypervisor; and information from software programs executing within the networked computing environment. In one example, a log file includes a plurality of entries (e.g., messages) and each entry is further comprised of information that can be parsed based on a message type. Embodiments of the present invention herein discuss message types as being related to message identifiers (IDs). Information within a message can include elements, such as a message prefix, a name, a message suffix, a timestamp, a message code, and information (e.g., data, text, response/return codes (RCs)). Embodiments of the present invention utilize one or more references to identify the structure, elements, and information of a message/log entry. In an example, an embodiment of the present invention accesses a system management facility reference library that identifies the structure of a message ID to include: a time stamp, a process ID, a return code, and text that is binary encoded as opposed to human-readable alphanumeric characters.

Embodiments of the present invention utilize one or more parsing and analytic programs known in the art and various references to restructure monitoring data, such as messages and log files, of a networked computing environment for further analysis. Some embodiments of the present invention restructure the data to a tabular format. Other embodiments of the present invention can restructure the log files and monitoring data into records that are stored in a database.

Embodiments of the present invention utilize restructured historical data and various analytical and cognitive techniques to identify patterns of message IDs that precede an event within a networked computing environment and to determine correlations between message IDs and the event. Examples of formats of restructured data include: tables, spreadsheets, and/or records within a database. Restructured data can also include links a reference and/or substituted information from a reference that is associated with an element of a log entry, such as a RC, since the RC for one message ID can have a different definition than an RC of another message ID. Some embodiments of the present invention can determine that occurrences (i.e., instances) of a single message ID are associated with an anomaly that is a precursor to an event within a networked computing environment. In addition, embodiments of the present invention can correlate the number of occurrences of the single message ID that occurs within a time interval (e.g., frequency of occurrence) to a prediction of an event within a networked computing environment.

Other embodiments of the present invention can determine that multiple factors interact to trigger an event within networked computing environment. Factors that interact to trigger an event within a networked computing environment include: overlaps between time intervals associated with two or more message IDs, an order in which message IDs occur, statistical thresholds associated with message IDs, a total number of occurrences of a message ID within a time interval, and synergistic correlations between message IDs. Various embodiments of the present invention can generate a mathematical algorithm and/or set of logical statements to define one or more correlations among message IDs and corresponding events within a networked computing environment. An algorithm can include one or more weight factors (WFs) respectively associated message IDs of the algorithm and in some instances a weight factor can be further determined and/or modified by one or more logical conditions.

Embodiments of the present invention also analyze historical data to determine one or more actions of a user to respond to an event within a networked computing environment. A response of a user to an event can include: displaying tables comprised of parsed message data, graphs and/or timelines depicting data included in one or more tables, and one or more actions of the user to mitigate or correct an event within a networked computing environment. Embodiments of the present invention generate a response for an event based on analyzing a plurality of historical user responses to the event that are preceded by similar patterns (e.g., correlations) of message IDs. In addition, embodiments of the present invention link a response stored in a database to factors (e.g., message IDs, correlations, intervals of time, etc.) that can be identified within incoming data from a networked computing environment.

Embodiments of the present invention integrate real-time analysis of data obtained from a networked computing environment to identify message ID trends to predict an event within the networked computing environment and identify a response to prevent or mitigate the event. Some embodiments of the present invention can determine a probability of an event ($P_{(event)}$) as opposed to a binary determination of occurs or does not occur. Further embodiments of the present invention enable automated responses to a predicted event via dynamic automations or a virtual engineer.

The present invention will now be described in detail with reference to the Figures. FIG. 1 is a functional block diagram illustrating networked computing environment 100 in an embodiment, in accordance with the present invention. In an embodiment, networked computing environment 100 includes: server 102, client device 120, and computer system 150 all interconnected over network 110. Many modifications to the depicted environment may be made by those skilled in the art without departing from the scope of the invention as recited by the claims. Networked computing environment 100 can be supported by one or more users that include: system administrators, subject matter experts (SME), analysts, etc.

Server 102, client device 120, and computer system 150 can be: laptop computers, tablet computers, netbook computers, personal computers (PC), desktop computers, personal digital assistants (PDA), smart phones, wearable devices (e.g., digital eyeglasses, smart glasses, smart watches, etc.), or any programmable computer systems known in the art. In certain embodiments, server 102, client device 120, and computer system 150 represent computer systems utilizing clustered computers and components (e.g., database server computers, application server computers, etc.) that act as a single pool of seamless resources when accessed through network 110, as is common in data centers and with cloud-computing applications. In general, server 102, client device 120, and computer system 150 are representative of any programmable electronic device or combination of programmable electronic devices capable of executing machine-readable program instructions and communicating with users of server 102, client device 120, and computer system 150 via network 110. Server 102, client device 120, and computer system 150 may include components, as depicted and described in further detail with respect to FIG. 5, in accordance with embodiments of the present invention.

Server 102 includes: data storage 104, data analysis program 106, response database 108, monitoring program 200, and response program 300. In an embodiment, server 102 may also include various programs and/or databases, such as but not limited to: one or more parser, analytics, semantic, cognitive, and/or inferential reasoning programs to restructure and tabularize message log entries; a database management system; a virtual engineer program; etc. (not shown). In various embodiments, server 102 can access one or more programs, functions, and/or software services via network 110 from another networked computer system, such as a cloud-based system (not shown). In one example, server 102 accesses, via network 110, a cloud-based service provider that provides one or more parsers, analytics, semantics, cognitive, and/or inferential reasoning programs that restructure and tabularize log file entries and other software as a Software as a Service (SaaS) offering. In another example, server 102 accesses, via network 110, a cloud-based service provider that provides one or more analytics, statistical, cognitive, and/or correlation programs that can analyze restructured data via a Software as a Service (SaaS) offering.

In some embodiments, server 102 is a virtual machine (VM) executing within another computing system, such as computer system 150. In a further embodiment, server 102 can include an analytics program (not shown) that records and deconstructs an event that is manually resolved by a user and each action initiated by the user to resolve the event within networked computing environment 100. Results of the analytics program for the resolution event can be sorted in data storage 104 and/or response database 108. In an alternative embodiment, server 102 and associated software and databases monitor one or more computing systems, networks, etc. accessible via network 110 as a portion of a system management solution. In an example, server 102 operates within the private portion of a hybrid-cloud environment and via network 110, server 102 monitors both the private and public portions of the hybrid-cloud environment.

Data storage 104 includes one or more databases and/or file systems. In one embodiment, data storage 104 includes a database of historical information related to networked computing environment 100. Historical information related to networked computing environment 100 includes information, such as, but not limited to: previously detected events (e.g., hardware and software) within computer system 150 and/or network 110, archived system generated log files, previously identified anomalies, and responses by one or more users that support networked computing environment 100. In some scenarios, data storage 104 stores system-generated data, such as messages, log files (e.g., original format) data, etc. In other scenarios, data storage 104 stores restructured (e.g., parsed, analyzed, etc.) system-generated data. In various embodiments, data storage 104 includes references and/or linkages stored information. In an example, data storage 104 stores information related to events within networked computing environment 100 in a database such that, an event, a response of a user to the event, and data associated with the event are linked and can be cross-referenced. In an alternative embodiment, an instance of data storage 104 includes data archived on a storage system accessible via network 110.

In another embodiment, data storage 104 buffers system generated data, such as one or more log files and/or log messages (e.g., log entries, log records) as the log files and/or log entries are generated within networked computing environment 100. In some embodiments, data storage 104 includes various files and databases that include, but not limited to: intervals of time, a listing of message and/or log entry codes (e.g., prefixes, suffixes, names, etc.) and related information, monitoring and/or system parameters, statistical process control (SPC) criteria, message ID correlations and/or interactions, links that notify one or more users, etc. In addition, data storage 104 can include one or more customer preferences that affect a response. Customer preferences can include: tiered response thresholds based on a severity rating of an event, tiered response thresholds based on a calculated or probabilistic value of an identified anomaly, one or more customized responses, such as initiating a backup VM or initiating data mirroring, etc. In other embodiments, data storage 104 includes data associated with one or more log files and/or log entries as restructured data. In a further embodiment, data storage 104 communicates with response database 108 and can share and update data, such as responses, log message structures, SPC information associated with log entries, etc.

Data analysis program 106 includes one or more statistical, analytical, and simulation methods, such as descriptive analytics, predictive analytics, prescriptive analytics, and cognitive systems. In one embodiment, data analysis program 106 can include, but is not limited to programs for: statistical process control, analysis of variance (ANOVA), linear regressions, multivariate regression, linear algebra, signal-to-noise ratio methods, etc., that determine the relationships and/or correlations between information included in message log entries and other results (e.g., anomalies, events, etc.). In another embodiment, data analysis program 106 can use SPC to determine response levels for the occurrence (e.g., frequency) of one or more message log entries within a dictated time interval.

In various embodiments, data analysis program 106 can use one or more analytical or simulation methods to determine intervals of time that are utilized by monitoring program 200 to identify an anomaly. In an example, data analysis program 106 can utilize simultaneous perturbation stochastic approximation (SPSA). In another example, data analysis program 106 can use Monte Carlo-type simulations to determine the probabilities for various "what-if" scenarios. Data analysis program 106 can prioritize collection of message log data that occurs in temporal proximity to an anomaly; in response to data analysis program 106 determining that insufficient message log data exists to determine a correlation between low-occurrence a log message ID (e.g., a statistical outlier) and other message log entries that precede an anomaly.

Response database 108 is a database that includes system and user defined actions. In some embodiments, response database 108 is populated with responses obtained from an analysis of user actions stored in historical database 104 in response to one or more anomalies and/or precursors to events. In one embodiment, response database 108 includes charts, graphs, spreadsheets, etc., defined by one or more users that display (e.g., via UI 122) data obtained from restructured log files. In some embodiments, data analysis program 106 includes responses in the form of one or more warning messages that are communicated to a user of client device 120 as an early warning of an event within networked computing environment 100.

In a further embodiment, response database 108 includes responses (e.g., actions) that server 102 can automatically initiate when an anomaly is identified. In one scenario, response database 108 communicates one or more responses that include actions to a user of client device 120, where the user has the option to cancel the included actions during a predefined delay period. In another scenario, response database 108 interfaces with a dynamic automation program and a virtual engineer to initiate one or more actions in response to an identified anomaly to prevent an event within networked computing environment 100.

In an embodiment, computer system 150 can be one of the types of computing devices previously discussed, such as a data center or a component of a data center. In an alternative embodiment, computer system 150 can be one or more virtualized entities, such as a VM, a virtual storage device, a virtual LAN, etc., operating within networked computing environment 100.

Monitoring program 200 is a program that analyzes messages and log files generated by networked computing environment 100 to identify an anomaly within the networked computing environment and the monitoring program determines a response to one or more identified anomalies. In one embodiment, monitoring program 200 utilizes the determined response to decrease the severity of, or prevent an occurrence of, an event within networked computing environment 100. In an embodiment, monitoring program 200 predicts (e.g., identifies) an anomaly and determines a response that includes, but is not limited to: charts, graphs, links to historical records, warning messages, and one or more corrective actions that are communicated to a user that supports networked computing environment 100, such as a system administrator, and that are actionable by the user. In some embodiments, monitoring program 200 determines a response that is flagged as semi-automatic. In an example, monitoring program 200 determines a response to an identified anomaly that delays for a Go/No Go indication from a user. In a further embodiment, monitoring program 200 determines a response that users of networked computing environment 100 have sufficient experience and success that the response is flagged for automatic initiation in response to an identified anomaly.

In other embodiments, monitoring program 200 aggregates restructured incoming data for an ongoing analysis. In one scenario, monitoring program 200 aggregates restructured incoming data until statistically significant (e.g., meets a SPC threshold) message data and/or log entry data is identified. In an example, monitoring program 200 analyzes incoming data to identify two message IDs that historically precede an event within networked computing environment 100. However, until monitoring program 200 determines that the frequency of occurrence of the two message IDs meets one or more SPC criteria (e.g., thresholds), monitoring program 200 does not identify an anomaly related to the two message IDs. In another scenario, monitoring program 200 determines that time is a variable associated with one or more correlations within an analysis used to determine whether incoming data of networked computing environment 100 indicates an incipient event within the networked computing environment. In various embodiments, monitoring program 200 can modify a time interval utilized by analysis based on various criteria, SPC thresholds, and/or correlations stored in data storage 104. For example, monitoring program 200 can: increase/decrease an analysis interval, incrementally shift an analysis interval in time, shift an analysis interval in time based on identifying a correlated key attribute (e.g., message ID), or a combination thereof.

Response program 300 is a program that determines one or more factors associated with messages and data generated by networked computing environment 100 that contribute to an anomaly and/or event within the networked computing environment. Response program 300 can execute concurrently with monitoring program 200. In one embodiment, response program 300 analyzes historical data stored in data storage 104 and identifies one or more messages and data (e.g., log files) generated by networked computing environment 100 that occur prior to an anomaly and/or event within the networked computing environment. In various embodiments, response program 300 utilizes multiple instances of data analysis program 106 to determine: message types (e.g., message IDs) and corresponding data, a frequency of occurrence of each message type prior to an anomaly and/or event, interactions among identified message types, and intervals of time associated with message types that generate events within networked computing environment 100.

In another embodiment, response program 300 analyzes historical data to determine one or more actions (e.g., responses) of a user in response to an occurrence of an anomaly and/or event within networked computing environment 100. In various embodiments, response program 300 combines correlated factors and actions of a user, either historical or current, to generate or modify a response. Responses generated by response program 300 are utilized by monitoring program 200 to respond to the identification of messages and/or data, generated by networked computing environment 100, that correlate to factors associated with an anomaly and/or event within the networked computing environment.

In a further embodiment, response program 300 can include a confidence criterion within a determined response. A confidence criterion can be utilized to indicate a success rate or an accuracy of a response. In an example, response program 300 can increase a confidence criterion of a response for each successful utilization of the response, decrease the confidence criterion of a response for each unsuccessful utilization the response or decrease the confidence criterion for a user-modified utilization of the determined response. In such an embodiment, response program 300 indicates to a user of networked computing environment 100 whether a response to a set of monitoring criteria is sufficiently tested to warrant automation.

In one embodiment, client device 120 and computer system 150 communicates through network 110 to server 102. In another embodiment, client device 120 communicates with one or more other computing systems and/or computing resources, such as a web server, an e-mail server, etc. (not shown) via network 110. In various embodiments, server 102 monitors more other computing systems and/or computing resources, such as a web server, a database, a storage area network (not shown), etc. that communicate via network 110.

Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between server 102, client device 120, and computer system 150, in accordance with embodiments of the present invention. In various embodiments, network 110 operates locally via wired, wireless, or optical connections and can be any combination of connections and protocols (e.g., personal area network (PAN), near field communication (NFC), laser, infrared, ultrasonic, etc.).

In one embodiment, client device 120 is a computing device of a user, such as a system administrator, a SME, analysts, etc. Client device 120 can include: user interface (UI) 122 and various programs and electronic documents (not shown). Examples of types of programs that client device 120 can include are: a web browser, a file manager, visualization software, and an office productivity suite of programs (e.g., a word processor, a graphics program, a spreadsheet program, an e-mail program, etc.). In another embodiment, client device 120 can be a terminal that is included in server 102.

In one embodiment, UI 122 may be a graphical user interface (GUI) or a web user interface (WUI). UI 122 can display text, documents, spreadsheets, graphs, user options, application interfaces, and instructions for operation; and include the information, such as graphic, text, and sound that a program presents to a user. In various embodiments, UI 122 displays one or more responses determined by monitoring program 200. In addition, UI 122 can control sequences/actions that the user employs to monitor an anomaly/event, input actions in response to the anomaly/event, modify a previous determined response and/or validate a response via response program 300. In some embodiments, a user of client device 120 can interact with UI 122 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate UI 122 operating within the GUI environment of client device 120.

Figure 2:
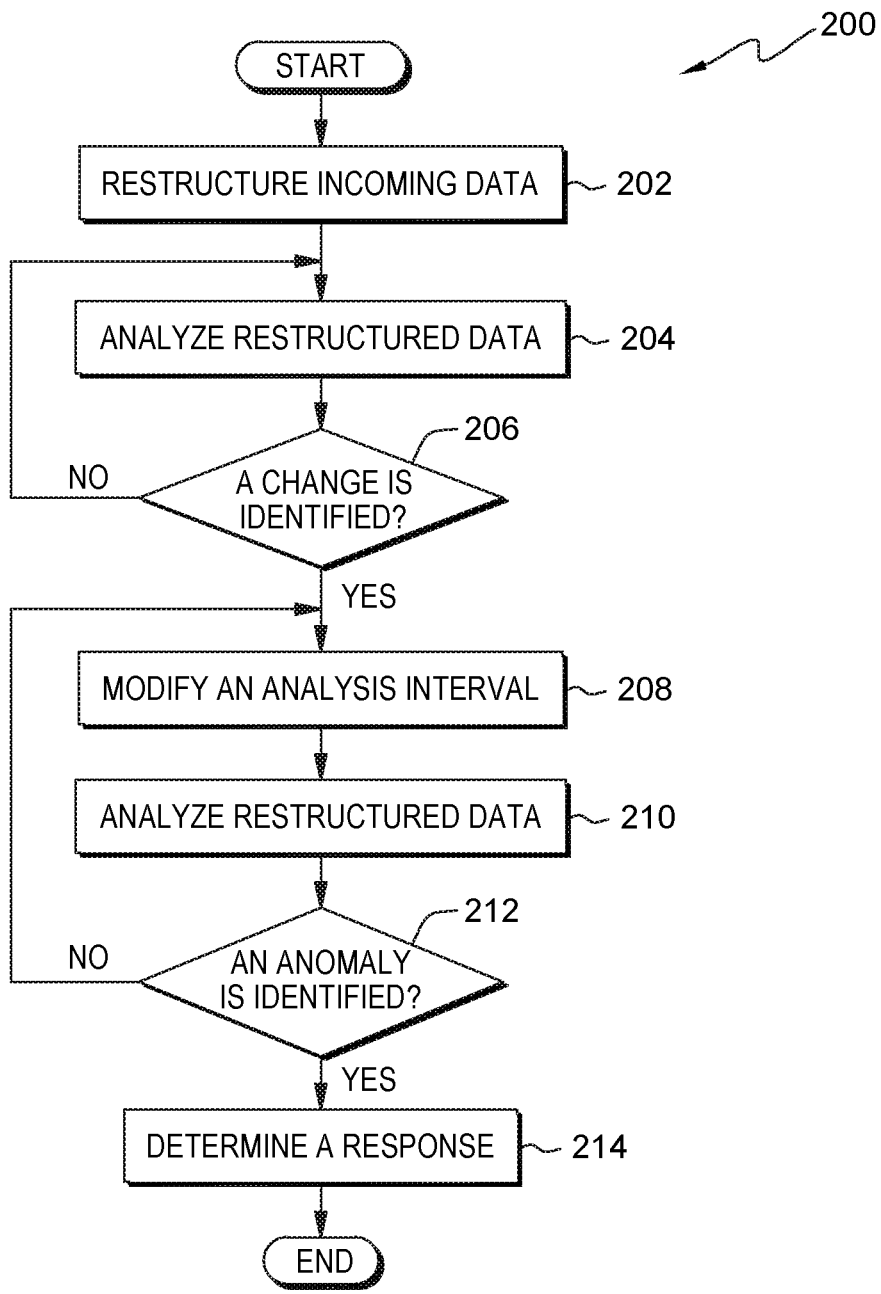
FIG. 2 depicts a flowchart of the operational steps of a monitoring program, in accordance with an embodiment of the present invention.

FIG. 2 is a flowchart depicting operational steps for monitoring program 200, a program that analyzes messages and log files generated by networked computing environment 100 to identify an anomaly within the networked computing environment, in accordance with embodiments of the present invention. In addition, monitoring program 200 determines a response to one or more identified anomalies and the determined response is utilized to decrease the severity of or prevent an event within networked computing environment 100, in accordance with embodiments of the present invention. In some embodiments, networked computing environment 100 transmits messages and log files to monitoring program 200. In other embodiments, monitoring program 200 obtains messages and log files from networked computing environment 100, such as passively by monitoring one or more communication busses, or actively by polling elements of networked computing environment 100, such as computer system 150 or a router (not shown) of network 110.

In step 202, monitoring program 200 restructures incoming data. Monitoring program 200 can utilize one or more parsing and analytic programs known in the art to restructure the incoming data. In some embodiments, monitoring program 200 utilizes one or more references and/or system libraries to identify the structure of a message ID to a parser. In one embodiment, monitoring program 200 restructures incoming data in real time, such as when a log file or discrete messages are communicated. In another embodiment, monitoring program 200 restructures incoming data on periodic bases, such as every 5 minutes.

In step 204, monitoring program 200 analyzes restructured data. In one embodiment, monitoring program 200 utilizes data analysis program 106 to analyze the restructured incoming log data to identify a plurality of key attributes, such as message IDs, message prefixes, timestamps, process IDs, response codes, indications that state data of a device is included, etc. In some embodiments, monitoring program 200 can aggregate analyzed restructured data based on which element of networked computing environment 100 generated a message and/or a log file entry. In another embodiment, monitoring program 200 aggregates the restructured incoming data to obtain statistically significant results that identify a change within networked computing environment 100 as opposed to identifying spurious messages. In some embodiments, monitoring program 200 further aggregates restructured data, based on receiving additional incoming data while looping via the "No" branch of decision step 206. In various embodiments, monitoring program 200 utilizes information and correlations stored in data storage 104 to determine which key attributes of instances message ID that are associated with known events (discussed in further detail with response to response program 300).

In a further embodiment, monitoring program 200 can modify one or more criteria utilized for an analysis of restructured data. In one example, monitoring program 200 can utilize a decision tree to reduce the number of possible changes to identify based on a smaller set of aggregated data, and as addition data is received further refining which changes are identified. In another example, monitoring program 200 can utilize probabilistic criteria to identify a change within the incoming data. In this example, if one or more events occurred within networked computing environment 100 within a specified time interval, then monitoring program 200 can reduce a threshold for identifying a change in response to other events occurring within the networked computing environment.

In decision step 206, monitoring program 200 determines whether a change is identified in the analyzed restructured data. In one embodiment, monitoring program 200 determines that an analysis of the restructured data identifies a change based on identifying one or more log entries that include attributes that relate to one or more message IDs that occur prior to an event. In another embodiment, monitoring program 200 obtains SPC data from data storage 104 for comparison to one or more entries of the analyzed restructured data. In some embodiments, monitoring program 200 determines that a change is identified based on one or more correlations, interrelated factors, and/or criteria stored in data storage 104. Examples of correlations, interrelated factors, and/or criteria are discussed further with respect to FIGS. 4a, 4b, and 4c. Responsive to determining that a change is not identified (No branch, decision step 206), monitoring program 200 loops to analyze additional restructured data (step 204).

Responsive to determining that a change is identified (Yes branch, decision step 206), monitoring program 200 modifies an analysis interval as depicted in step 208.

In step 208, monitoring program 200 modifies an analysis interval. For example, monitoring program 200 modifies an analysis interval: by increasing/decreasing a duration of the analysis interval, by shifting the analysis interval forward/backward along a timeline, and by initiating or resetting a start of the analysis interval based on an event within a time series, etc. In one embodiment, monitoring program 200 utilizes a default analysis interval to determine whether an identified change is related to an anomaly. In another embodiment, monitoring program 200 modifies an analysis interval based on receiving additional restructured data for analysis. In some embodiments, monitoring program 200 modifies an analysis interval (e.g., time frames) by iteration.

In other embodiments, monitoring program 200 modifies an analysis interval by selecting/deselecting one or more message entries. In an example, monitoring program 200 determines that instances of a message ID are distributed in a time series at a low occurrence rate. After a period of time, monitoring program 200 deselects a portion of the oldest instances to ensure that a statistical average calculation is sensitive to future changes in the occurrence rate of the message ID.

In various embodiments, monitoring program 200 dynamically modifies an analysis interval based on identified change. In one scenario, monitoring program 200 determines that an identified change is associated with a message ID/message prefix that can cause an anomaly and/or event if an interrelated factor (e.g., a different message ID/message prefix) occurs within an identified time interval. In an example, monitoring program 200 identifies that instances of message ID x23Rt1 occurred equal to or greater than a SPC threshold (e.g., trigger value) in a 180 second analysis interval. Message ID x23Rt1 does not cause an anomaly when isolated; however, if ten or more instances of message ID Tqp004 occur within +/−60 seconds of the last instance of Message ID x23Rt1, then an anomaly has occurred in the historical record. Monitoring program 200 modifies a time interval such that the analysis interval shortens to capture the +/−60 second window associated with message ID Tqp004. In addition, monitoring program 200 further modifies the analysis interval to track each new instance of Message ID x23Rt1. In another scenario, monitoring program 200 dynamically modifies an analysis interval based on additional criteria associated with one or more message ID that can interact.

In step 210, monitoring program 200 analyzes restructured data. Monitoring program 200 utilizes one or more aspects of data analysis program 106 to analyze restructured data to identify an anomaly, such as an increase in the number of data resends associated with a failing communication port. In some embodiments, monitoring program 200 utilizes one or more files and/or databases within data storage 104 to obtain: SPC values, correlations, interrelated factors, etc. related with one or more message ID that are associated with one or more anomalies and/or events of networked computing environment 100. In one embodiment, monitoring program 200 analyzes restructured data based on a default time interval. In an example, monitoring program 200 analyzes the restructured data and determines that message IDs e01, f03, and g05 occur within a default analysis interval T(0-10) and that message IDs e01, f03, and g05 are associated with an anomaly. Monitoring program 200 determines that the average occurrences of message IDs e01, f03, and g05 within analysis interval of ten time-units (e.g., T(0-10)) do not meet a statistical criterion.

In another embodiment, monitoring program 200 analyzes restructured data based on a time interval associated with an identified change. In various embodiments, monitoring program 200 analyzes restructured data to determine whether one or more SCP thresholds for a message ID is met or exceeded for a modified analysis interval, as discussed in further detail with respect to FIGS. 4a, 4b, and 4c. In some scenarios, monitoring program 200 identifies an anomaly based on one or more SCP thresholds. In other scenarios, monitoring program 200 utilizes one or more logical conditions identified by data analysis program 106 to determine that a different analysis interval is dictated.

In other embodiments, monitoring program 200 analyzes restructured data based on a modified time interval related to looping via the "No" branch of decision step 212 and modifying an analysis interval as discussed with respect to step 208. In the previous example, monitoring program 200 determines that the statistical criterion for identifying an anomaly associated with message IDs e01, f03, and g05 is based on an analysis interval of three time-units.

In a further embodiment, monitoring program 200 analyzes restructured data to determine whether one or more factors and/or correlations trigger an identification of an anomaly based on additional data and/or modifications to one or more analysis intervals. In some instances, monitoring program 200 can determine from correlations that a first analysis of the restructured data identifies two or more possible anomalies based on a first message ID. Monitoring program 200 can initiate other instances of data analysis program 106 to identify other information within the restructured data that further identifies one or more anomalies.

In decision step 212, monitoring program 200 determines whether an anomaly is identified. In one embodiment, monitoring program 200 determines that an anomaly is identified based on an analysis of the restructured data based on default time interval utilized to analyze restructured data. In an example, monitoring program 200 can identify an anomaly based on the number of occurrences of one or more message IDs and related SPC values within one or more analysis intervals. In some embodiments, monitoring program 200 determines that an anomaly is identified within an analysis of the restructured data based on a modified analysis interval utilized to analyze restructured data. Still referring to the previous example, monitoring program 200 does not identify an anomaly based on a ten time-unit analysis interval. Monitoring program 200 utilizes the "No" branch of decision step 212 to modify the analysis interval to three time-units, as depicted in step 208, and then iteratively analyzes the restructured data at three time-unit intervals, as depicted in step 210. In this example, monitoring program determines that average occurrences of message ID e01 for T(4-7), message ID f03 for T(2-5) and message ID g05 for T(6-9) meet respective SCP criterion, and monitoring program identifies an anomaly, "Yes" branch of decision step 212.

In other embodiments, monitoring program 200 can determine that two or more events within networked computing environment are associated with an anomaly. In an example, monitoring program 200 identifies an anomaly associated with a degradation of performance event. However, monitoring program 200 can analyze subsequent restructured data which can determine whether the anomaly predicts a failure within a portion of networked monitoring system 100. In various embodiments, monitoring program 200 identifies an anomaly that predicts an event within networked computing environment 100.

In another embodiment, monitoring program 200 identifies an anomaly that is associated with a warning and/or calculated value (e.g., a probability) of an algorithm. In another example, monitoring program 200 determines that a customer preference includes sensitivity value of an event, such as initiate a warning at a 75% probability of an event and a response if the probability of an event exceeds 85%. If monitoring program 200 determines that a calculated value (e.g., a probability) associated with an analysis indicates that the calculated value meets a sensitivity value of a customer, then monitoring program 200 determines that an anomaly is identified.

Still referring to decision step 212, in the alternative embodiment, monitoring program 200 can execute another instance of monitoring program 200. Monitoring program 200 can dictate that one instance of the monitoring program proceeds via the "Yes" branch of decision step 212 and determines a response to a first event associated with the anomaly. The other instance of monitoring program 200 can proceed via the "No" branch of decision step 212 to obtain additional data and/or modify an analysis interval to identify (e.g., predict) an occurrence of a second event associated with the identified anomaly. Responsive to a determination that an anomaly is identified (Yes branch, decision step 212), monitoring program 200 determines a response (step 214).

In step 214, monitoring program 200 determines a response. In various embodiments, monitoring program 200 queries responses database 108 to determine a response based on an identified anomaly. In one embodiment, monitoring program 200 determines a response that includes one or more analyses that are communicated to a user via UI 122, such as a system administrator, a SME, etc. The one or more analyses that monitoring program 200 can include are graphs, tables, and details identifying one or more identified anomalies. In addition, the one or more analyses of monitoring program 200 can include a severity code (e.g., warning, minor impact, major impact, critical failure, etc.) of a predicted event within networked computing environment 100. In another embodiment, monitoring program 200 communicates one or more actions that a user can initiate in response to the identified one or more identified anomalies to minimize and/or prevent an event that has a negative impact on computer system 150 and/or another portion of networked computing environment 100. In one scenario, monitoring program 200 receives input from a user (e.g., an administrator) of networked computing environment 100, via UI 122, that confirms the one or more actions of a determined response. In some instances, monitoring program 200 initiates an action confirmed by a user. In other instances, a confirmation of an action by a user initiates the action.

In a further embodiment, monitoring program 200 initiates one or more actions of a determined response. In one scenario, monitoring program 200 identifies one or more indications (e.g., flags) within a response that signifies which actions of a response initiate automatically. In another scenario, monitoring program 200 identifies that a response includes an override delay associated with one or more actions of the response. An override delay can be utilized by monitoring program 200 to enable a user to responds to one or more actions of the response, if the user does not respond within the time delay of the determined response, then monitoring program 200 initiates one or more actions of the determined response that are associated with the override delay.

In an alternative embodiment, monitoring program 200 determines a response based on a probabilistic value and/or a calculated value as opposed to a binary response. In one example, monitoring program 200 determines that a customer preference includes a tiered set of responses that are based on a calculated value of an algorithm utilized to identify an anomaly.

Referring to decision step 212, responsive to a determination that an anomaly is not identified (No branch, decision step 212), monitoring program 200 determines loops to modify an analysis interval (step 208).

Figure 3:
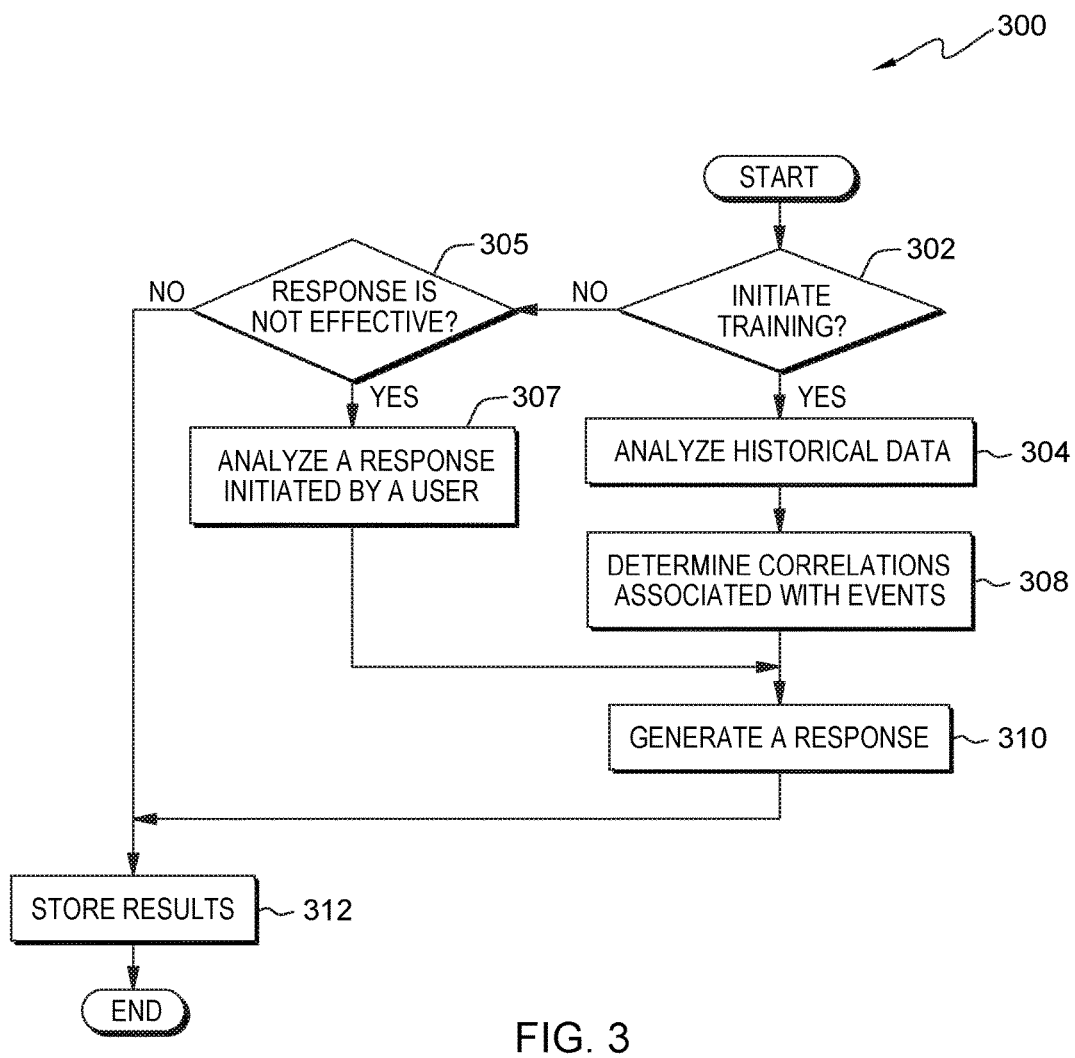
FIG. 3 depicts a flowchart of the operational steps of a response program, in accordance with an embodiment of the present invention.

FIG. 3 is a flowchart depicting operational steps for response program 300, a program for analyzing historical data of a networked computing environment to determine correlations between the historical data, an event within the networked computing environment, and actions of a user in response to the event, in accordance with embodiments of the present invention. In various embodiments, response program 300 combines correlated factors and actions (e.g. responses), either historical or current, of a user to generate and/or modify responses to respond to the future detection of messages and/or data generated by a networked computing environment that includes the correlated factors associated with an anomaly and/or event within the networked computing environment.

In decision step 302, response program 300 determines whether to initiate training. In an embodiment, response program 300 determines to initiate training based on response program 300 identifying that one or more tables of response database 108 are not populated. In an example, response program 300 determines to initiate training when one or more cause/effect/response tables are not populated within response database 108. In various embodiments, response program 300 determines to initiate training based on response program 300 identifying one or more anomalies and/or events that are include log entries that are not correlated by data analysis program 106. In another embodiment, response program 300 determines to initiate training on input from a user via UI 122. If response program 300 determines to initiate training (Yes branch, decision step 302), then response program 300 analyzes historical data as depicted in step 304.

In some embodiments, response program 300 determines not to initiate training based on monitoring program 200 determining a response to an identified anomaly. Subsequently, response program 300 determines whether the response determined by monitoring program 200 is not effective, depicted in decision step 305. In other embodiments, response program 300 determines not to initiate training based on identifying a manual response of a user to an anomaly and/or an event detected within networked computing environment 100.

In step 304, response program 300 analyzes historical data. In one embodiment, response program 300 retrieves unstructured historical log data from data storage 104 and/or another storage location accessible via network 110. In addition, response program 300 utilizes one or more parser, analytics, semantic, cognitive, and/or inferential reasoning programs to restructure and tabularize historical data for analysis by an instance of data analysis program 106. In another embodiment, response program 300 utilizes data analysis program 106 to analyze restructured historical data.

In various embodiments, response program 300 executes one or more aspects (e.g., functions, programs, algorithms, etc.) of data analysis program 106. In one scenario, response program 300 executes an instance of data analysis program 106 to identify and/or aggregate log entries and associated data that occurred within temporal proximity (e.g., a period of time prior to) to an anomaly and/or an event within networked computing environment 100. For example, response program 300 utilizes data analysis program 106 to filter message IDs associated with operational variables from log entries associated with message IDs that are identified with stable operations of networked computing environment 100. In one instance, response program 300 stores the results of this analysis in data storage 104. In another instance, response program 300 caches the results of this analysis in volatile memory (discussed further with respect to FIG. 5) of server 102. In another scenario, response program 300 executes different instance (e.g., other aspects) of data analysis program 106 to further analyze the results to determine a frequency of occurrence for log entries that meet one or more criteria, such as a message ID that includes data (e.g., response codes (RCs)) associated with an abnormal state value.

Referring to decision step 302, responsive to a determination not to initiate training (No branch, decision step 302), response program 300 determines whether a response is not effective as depicted in decision step 305.

In decision step 305, response program 300 determines whether a response is not effective. In one embodiment, response program 300 determines that a response is not effective if monitoring program 200 identifies an anomaly, determines a response, and an event predicted by the monitoring program does not occur (e.g., a false-positive prediction). In some embodiments, response program 300 determines that a response is not effective if monitoring program 200 identifies one or more anomalies, determines a response, and the response determined by the monitoring program does not mitigate and/or prevent a predicted event within networked computing environment 100. In other embodiments, response program 300 determines that a response is not effective if monitoring program 200 identifies one or more anomalies; however, monitoring program does not determine a response, and an event occurs within networked computing environment 100. In various embodiments, response program 300 determines that a response is not effective if a user supporting networked computing environment 100 initiates one or more actions not identified within a response determined by monitoring program 200 and/or excludes one or more actions of the determined response. Responsive to a determination that a response is not effective (Yes branch, decision step 305), response program 300 analyzes a response initiated by a user as depicted in step 307.

In step 307, response program 300 analyzes a response initiated by a user. In one embodiment, response program 300 analyzes a response of a user to determine one or more changes (e.g., actions) lacking from a current response determined by monitoring program 200. In some embodiments, response program 300 analyzes a response of a user to an anomaly and/or event within networked computing environment 100 that was not predicted by monitoring program 200. In other embodiments, response program 300 determines that a user flags one or more log entries, analysis intervals, SPC values, etc., as contributing to a false-positive response. In an alternative embodiment, response program 300 identifies that a response includes a confidence level and response program 300 reduces the confidence level of a response based on various criteria, such as, but not limited to, correlations flagged by a user, one or more actions of a user not included in a response, one or more actions of a response that are flagged by a user for deletion or modification, and a severity of an event that occurs based on the ineffective response.

In step 308, response program 300 determines correlations associated with events. In one embodiment, response program 300 determines correlations associated with events based on one or more analyzes of historical data. In one scenario, response program 300 utilizes data analysis program 106 to determine various SPC values associated with message IDs/message prefixes that are identified with anomalies and/or events. In another scenario, response program 300 determines sets of message ID that occur within various intervals of time prior to an anomaly and/or event. In some embodiments, response program 300 utilizes one or more classification algorithms (not shown), such as an artificial neural network (ANN), a naïve bayes classifier, a support vector machine, etc. that utilizes multiple variables (e.g., message IDs, time, etc.) to classify one or more variables (e.g., message IDs) into two or more distributions or groups. Subsequently, response program 300 utilizes data analysis 106 to determine one or more correlations among messages IDs of each group and/or among groups. In an embodiment, response program 300 stores the determined SPC values and log entry correlations in data storage 104.

In various embodiments, response program 300 generates an algorithm and/or logical statements that describe a correlation among message IDs that predict an event. In an example, response program 300 determines that message ID x10 and message ID y20 are associated with an event within networked computing system 100, that the weight factor for message ID y20, WF[y20] varies based on logical conditions associated with the average (i.e., avg) number of instances of message ID x10 within an analysis interval, and the SPC threshold (e.g., SCP [x10]) for message ID x10. In this example, response program 300 determined that the logical conditions associated with message ID x10 that affect the WF[y20] are:

a. If avg x10<1.5 SCP [x10], then WF[y20]=0.25;
b. If 1.5 SCP [x10]<=avg x10<1.8 SPC [x10], then WF[y20]=0.40; and
c. If avg x10>1.8 SCP [x10], then WF[y20]=0.55

In some scenarios, response program 300 generates an algorithm and/or logical statements that produce a binary determination of the prediction of an event. In other scenarios, response program 300 generates an algorithm and/or logical statements that produce a probabilistic determination associated with the prediction of an event. In an example, response program 300 determines that for an event associated with message IDs q11, r22, and s33 that a probabilistic correlation is determined and that the correlation is independent of a SCP threshold. However, response program 300 determined that the probabilistic correlation utilizes the average occurrences of message IDs q11, r22, and s33 within respective analysis intervals, such as $P_{(event)}$=WF[q11]*avg q11+WF[r22]*avg r22+WF[s33]*avg s33.

In a further embodiment, response program 300 can utilize one or more aspects of data analysis program 106 to determine interrelatedness (e.g., interactions) of factors associated with log entries. In some scenarios, response program 300 identifies an interaction among factors that generate a synergistic effect. An example of a synergistic interaction (e.g., effect) among message IDs is, within an identified time interval, if message ID x84tZ occurs 10 times or less, then an event occurs if-and-only-if message ID qq194 occurs more than 20 times; however, if within the identified time interval message ID x84tZ occurs 11 times or more, then an event occurs if message ID qq194 occurs more than 15 times.

In step 310, response program 300 generates a response. In one embodiment, response program 300 identifies a plurality of actions of one or more users that responded to multiple instances of an anomaly and/or event identified within historical data stored in data storage 104. Response program 300 utilizes one or more methods to combine the plurality of actions of the one or more users to determine a set of actions that are included in a response. In an example, response program 300 first identifies a plurality of instances of an event and groups the instances of the event by similar log entry signatures (e.g., time intervals, SPC values, correlated message IDs, data, etc.) of the events. Subsequently, response program 300 identifies the actions of users in response to the instances of events within a group. In this example, response program 300 utilizes a commonality factor of 70% to select actions that are included in a response. Actions that occur within 70% or more of the instances of the event are included in a response.

In some embodiments, response program 300 utilizes input from a user, via UI 122, to verify a generated response. In an example, response program 300 can receive input from a user that includes: modifying a weight factor of an algorithm, adjusting an analysis interval of a message ID, adjusting a probability threshold for initiating a response, etc. In other embodiments, response program 300 automatically generates a response and the response program can modify the generated response via the "No" branch of decision step 305. In a further embodiment, response program 300 determines that a response can be automated and identifies one or more conditions (e.g., flags) that enable monitoring program 200 to initiate one or more actions of a determined response.

In step 312, response program 300 stores results. Results include: a generated, response, a modified response, one or more correlations, and a modification to a confidence level of a response. In one embodiment, response program 300 stores a generated and/or modified response in response database 108. In another embodiment, response program 300 stores and/or cross-references (e.g., links) responses in response database 108 with time intervals, SPC values, correlated message IDs, correlation values/algorithms in data storage 104. In some embodiments, response program 300 stores a modified confidence level of a response. In one scenario, response program 300 determines that a response is effective (No branch, decision step 305) and stores the result of the response with an increased confidence level. In another scenario, response program 300 determines that a response is not effective (Yes branch, decision step 305) and stores the result of the response with a decreased confidence level.

Figure 4A:
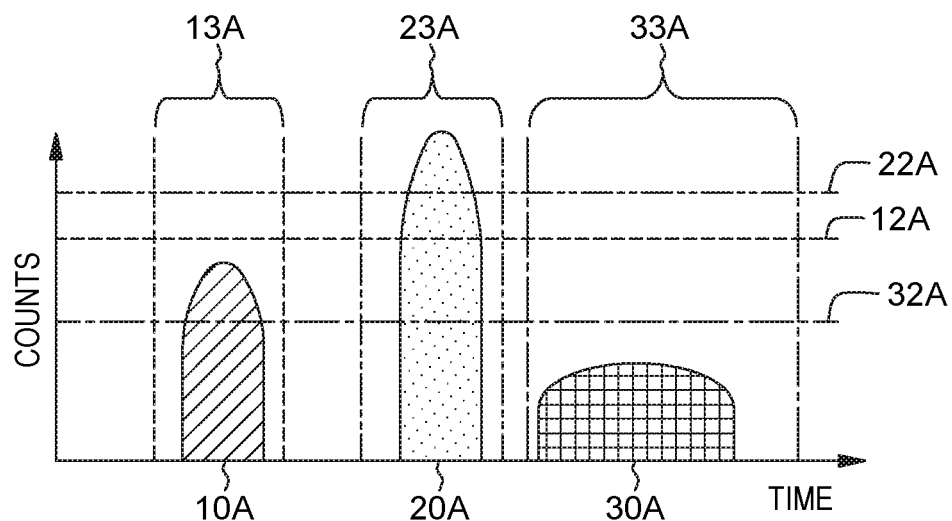
FIGS. 4a, 4b, and 4c depict graphical examples of timelines for message frequencies and associated statistical thresholds, in accordance with an embodiment of the present invention.
Figure 4B:
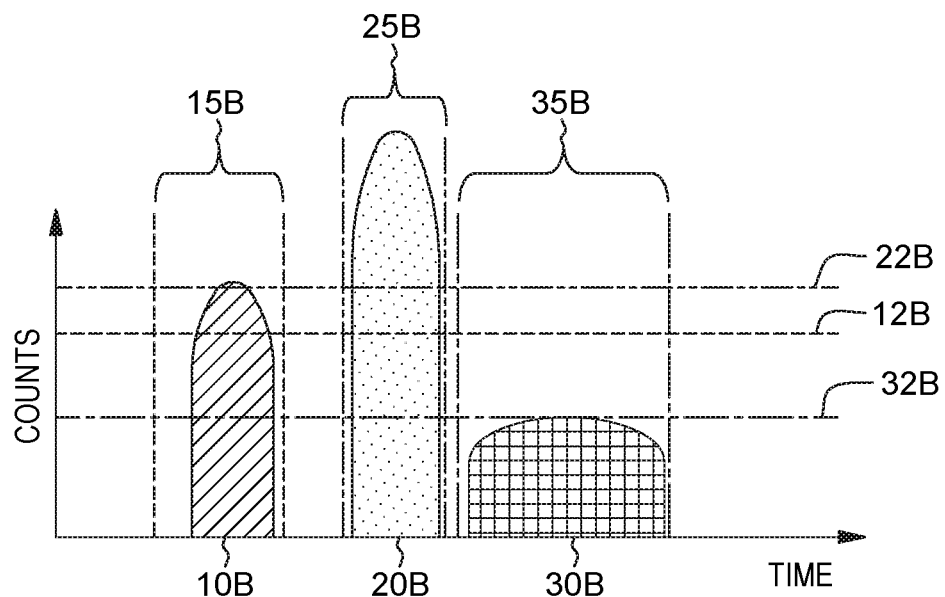
Figure 4C:
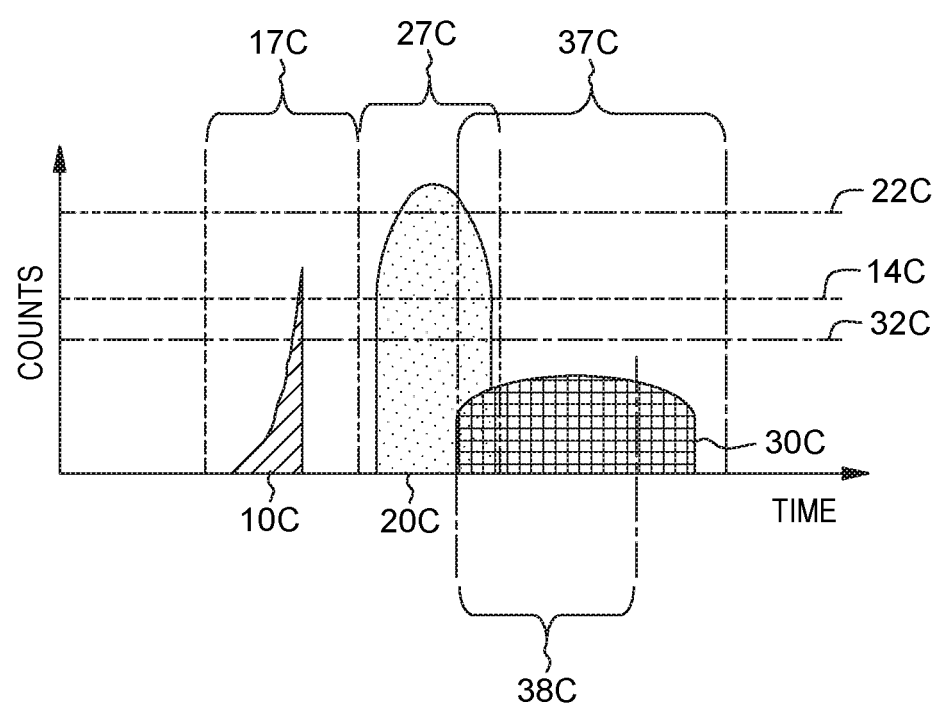

FIGS. 4a, 4b, and 4c depict graphical examples of timelines associated with three types of message IDs generated within networked computing environment 100 that are identified as occurring singly or in combination prior to an event. FIGS. 4a, 4b, and 4c depict frequencies of occurrence (i.e., counts) associated with analyzed message IDs 10 (diagonal-hash shading areas), 20 (stipple shading areas), and 30 (cross-hash shading areas). In an embodiment, FIGS. 4a, 4b, and 4c utilize a rectangle with a rounded end to depict the distributions of counts related to message IDs 10, 20, and 30. In addition, the peak associated with the rounded end of a rectangle indicates the average value of the counts corresponding to a message ID of an analysis interval. In other embodiments, the distribution of counts related to a message ID can display in different modes and/or shapes, such as discreet occurrences and as a cumulative curve within an analysis interval. In an example, referring to FIG. 4c, the semi-triangular area of 10C corresponds to a total count (e.g., cumulative distribution) of message ID 10. In an embodiment, FIGS. 4a, 4b, and 4c include SCP thresholds, as depicted by horizontal lines, corresponding to message IDs 10, 20, and 30. In various embodiments, FIGS. 4a, 4b, and 4c include one or more analysis intervals (i.e., intervals of time) that are associated with message IDs 10, 20, and 30. In the following examples, FIGS. 4a, 4b, and 4c identify the analysis interval for each message ID using the line style corresponding to the SCP threshold for that message ID.

FIG. 4a is an example timeline associated with three message IDs, herein identified as ID 10, ID 20, and ID 30 that are identified within data obtained from networked computing environment 100. In this example, the three message IDs are associated with one or more correlations that precede an event within networked computing environment 100. The rounded-end rectangles, 10A, 20A, and 30A include the respective distributions of occurrences (e.g., instances, counts) of message ID 10, ID 20, and ID 30 identified within the data obtained from networked computing environment 100. FIG. 4a includes SPC control limits (e.g., threshold values) 12A (dashed line), 22A (double dash, long dash line), and 32A (dash, long dashed line) respectively associated with message ID 10, ID 20, and ID 30. In addition, FIG. 4a includes analysis intervals 13A (dashed lines), 23A (double dash, long dash lines), and 33A (dash, long dashed lines) respectively associated with message ID 10, ID 20, and ID 30.

In one example, monitoring program 200 determines that a correlation among ID 10, ID 20, and ID 30 dictates that the average occurrences associated with ID 10, ID 20, and ID 30 within a respective analysis interval each must meets or exceeds a corresponding SPC threshold, as depicted by 12A, 22A, and 32A. In this example, FIG. 4a depicts distributions of occurrences of ID 10, ID 20, and ID 30 that do not predict an event.

In another example, monitoring program 200 determines that another correlation among ID 10, ID 20, and ID 30. The other correlation indicates that if the average occurrences of ID 20 exceeds an SCP control limit (referring to FIG. 2 step 210 and decision step 212), then monitoring program 200 modifies one or more analysis intervals and reanalyzes the obtained data based on the modified time interval (referring to FIG. 2 steps 208 and 210). In this example, monitoring program 200 determines that the average count value of ID 20, as depicted by 20A exceeds SCP threshold 22A. Subsequently, monitoring program 200 utilizes a correlation and/or rule stored in data storage 104 that modifies analysis intervals 13A, 23A, and 33A as discussed with respect to FIG. 4b.

FIG. 4b depicts the effects of modifying analysis intervals 13A, 23A, and 33A to shorter analysis intervals (e.g., shorter periods of time) depicted by analysis intervals 15B (dashed lines), 25B (double dash, long dash lines), and 35B (dash, long dashed lines). The average occurrences of ID 10, ID, 20, and ID 30 are depicted by 10B, 20B, and 30B. In this illustrative example, the average occurrences of instances of ID 10 (10B) and ID 20 (20B) respectively exceeds SPC control limits 12B (dashed line) and 22B (double dash, long dash line). In addition, the average occurrences of instances of ID 30 (30B) meet SPC control limit 32B (dash, long dashed lines). In this example, monitoring program 200 predicts an event (identifies an anomaly referring to FIG. 2, decision step 212). In response to predicting an event, monitoring program 200 determines a response (referring to FIG. 2, step 214).

FIG. 4c illustrates other examples of correlations and/or interrelated factors that can predict an event within networked computing environment 100. In one example, FIG. 4c depicts interrelated factors that occur between instances of ID 10 and instances of ID 20. In this example, monitoring program 200 determines that the interaction between ID 10 and ID 20 includes the factors: SCP threshold 22C and analysis interval 27C associated with ID 20, SPC threshold 14C associated with cumulative distribution 10C, and SPC threshold 22C affects SPC threshold 14C and analysis interval 17C. In this example, if monitoring program 200 determines that the average occurrences of ID 20 (e.g., 20C) within analysis interval 27C meets or exceed SPC threshold 22C that SPC threshold 12A (referring to FIG. 4a) is modified to SPC threshold 14C. In addition, monitoring program 200 modifies an analysis interval associated with ID 10 such that the analysis interval is a one-sided interval as depicted by 17C (dashed line). In this example, monitoring program 200 determines that an event is predicted if the average instances of ID 20 (e.g., 20C) exceed SPC threshold 22 and the total number of instances of ID 10 (the semi-triangular, diagonal-hash area of 10C) exceeds modified SPC threshold 14C (dashed line) within analysis interval 17C (dashed lines), then monitoring program 200 predicts an event.

In another example, FIG. 4c depicts ID 20 and ID 30 interacting via overlapping occurrences and analysis intervals. In one instance, occurrences of ID 20 and ID 30 occur within respective analysis intervals of 27C (double dash, long dash lines) and 37C (dash, long dashed lines). In this instance, monitoring program determines, based on another correlation (e.g., set of criteria) that if average occurrences of ID 20 (e.g., 20C) exceed SPC threshold 22C (double dash, long dash lines), then monitoring program 200 predicts whether an event occurs based on one of two criteria. In this instance, monitoring program 200 determines that the first criterion (e.g., condition) is that the average occurrences of ID 30 meets SPC threshold 32C (dash, long dashed line), and the second criterion is that one or more instances of ID 30 occur between the start of analysis interval 37C and the end of analysis interval 27C. In this instance, based on the distribution of instances depicted by 30C, monitoring program 200 predicts an event occurs based on the second criterion.

In another instance, FIG. 4c depicts another correlation and associated set of criteria. In this other instance, monitoring program 200 determines a different set of correlations and criteria are utilizes to predict an event. Monitoring program 200 determines that the different set of correlations includes that analysis interval 37C initiates after 70% of analysis interval 27C is utilized, and if the average occurrences of ID 20 exceeds SPC threshold 22C, then monitoring program 200 predicts whether an event occurs based on another set criteria. In this other instance, monitoring program 200 determines that the first criterion is that the average occurrences of ID 30 within analysis interval 37C meets SPC threshold 32C, and the second criterion is that five or more instances of ID 30 occur within a time interval of duration 38C (dash, long dashed lines) that is contained within analysis interval 37C. Monitoring program 200 determines that time interval 38C initiates (e.g., triggers) based on identifying the first instance of ID 30, such data analysis program 106 identifying a timestamp of an instance of ID 30.

Figure 5:
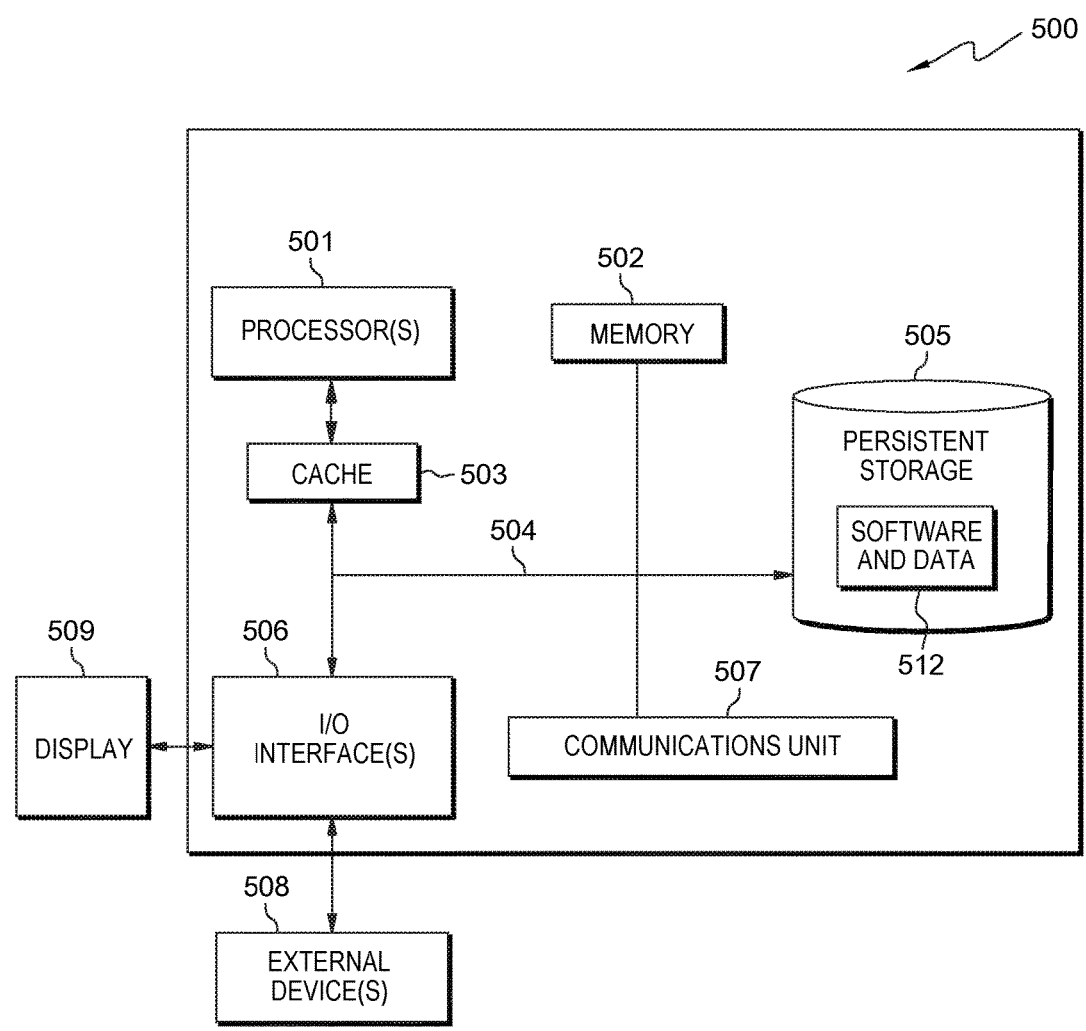
FIG. 5 is a block diagram of components of a computer, in accordance with an embodiment of the present invention.

FIG. 5 depicts a block diagram of computer system 500, which is representative of server 102, client device 120, and computer system 150. Computer system 500 is an example of a system that includes software and data 512. Computer system 500 includes processor(s) 501, memory 502, cache 503, persistent storage 505, communications unit 507, I/O interface(s) 506, and communications fabric 504. Communications fabric 504 provides communications between memory 502, cache 503, persistent storage 505, communications unit 507, and I/O interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to server 102, software and data 512 includes: data storage 104, data analysis program 106, response database 108, monitoring program 200, response program 300, and various programs (not shown).

Communications unit 507, in these examples, provides for communications with other data processing systems or devices, including resources of server 102, client device 120, and computer system 150. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions: The phrase "based on" should be interpreted to mean "based, at least in part, on."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The terms "receive," "provide," "send," "input," and "output," should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for automating responses to manage a networked computing environment, the method comprising the steps of:
   determining, by one or more computer processors, that incoming real-time data generated within a networked computing environment includes occurrences of a first set of two or more message identifiers (IDs) that correspond to a second set of two or more message IDs respectively associated with a historical occurrence of one or more anomalies within the networked computing environment;
   determining, by one or more computer processors, that the incoming real-time data correlates to a previous anomaly that occurred within the networked computing environment based on determining respective rates of occurrence of the first set of two or more message IDs included in the incoming real-time data and the second set of two or more message IDs respectively associated with the historical occurrence of the one or more anomalies and determining a relationship between the first set of two or more message IDs included in the incoming real-time data and the second set of two or more message IDs respectively associated with the historical occurrence of the one or more anomalies that precede one or more non-fatal events within the networked computing environment,
      wherein the determined relationship between the first set of two or more message IDs and the second set of two or more message IDs includes:
      (i) determining that the first set of two or more message IDs and the second set of two or more message IDs occur within a defined window of time,
      (ii) determining that the first set of message IDs and the second set of message IDs both include at least a first message ID and a second message ID,
      (iii) redetermining respective rates of occurrences of at least a second message ID based on a modified window of time in response to determining that a first threshold value corresponding to a first rate of occurrence of a first message ID within the defined window of time is exceeded, and
      (iv) determining respective rates of occurrence of the first set of two or more message IDs and the second set of two or more message IDs are above respective thresholds of occurrence values;
   responsive to determining that the incoming real-time data correlates to the previous anomaly that occurred within the networked computing environment based on the determined relationship between the first set of two or more message IDs included in the incoming real-time data and the second set of two or more message IDs respectively associated with the historical occurrence of the one or more anomalies, determining, by one or more computer processors, a first automated response to the previous anomaly that occurred based on accessing a first network-accessible database that stores a plurality of previously determined responses that correspond to one or more anomalies; and
   initiating, by one or more computer processors, the determined first automated response to one or more elements of the networked computing environment to prevent a non-fatal event within the networked computing environment.

2. The method of claim 1, further comprising the steps of:
   identifying, by one or more computer processors, a structure respectively associated with a message of a plurality of messages within included within the incoming real-time data by accessing a reference library; and
   determining, by one or more computer processors, information included within the incoming real-time data based on utilizing the identified structure respectively associated with the message, wherein the determined information respectively associated with the message includes a message ID and one or more elements selected from the group consisting of: a timestamp a response code, a message prefix, a process ID, and state data of an entity associated with a message.

3. The method of claim 1,
   wherein a relationship between the second set of two or more message IDs and a corresponding historical occurrence of an anomaly includes:
   (i) an order among occurrences of two or more message IDs of the second set of two or more message IDs,
   (ii) overlaps between time intervals respectively associated with at least two message IDs, of the second set of two or more message IDs, within the defined window of time, and
   (iii) one or more logical conditions related to interactions among at least two message IDs.

4. The method of claim 1, wherein a non-fatal event includes a degradation of performance associated with one or more executing software applications.

5. The method of claim 1, wherein networked computing environment is a hybrid-cloud environment, and wherein the first network-accessible database, a second network-accessible database, and one or more system management functions operate within a private-cloud environment.

6. The method of claim 1, wherein initiating the determined first automated response to one or more elements of the networked computing environment is performed utilizing dynamic automation and a virtual engineer.

7. A computer program product for automating responses to manage a networked computing environment, the computer program product comprising: one or more computer readable storage media and program instructions stored on the one or more computer readable storage media, the program instructions readable/executable by one or more computer processors:

program instructions to determine that incoming real-time data generated within a networked computing environment includes occurrences of a first set of two or more message identifiers (IDs) that correspond to a second set of two or more message IDs respectively associated with a historical occurrence of one or more anomalies within the networked computing environment;

program instructions to determine that the incoming real-time data correlates to a previous anomaly that occurred within the networked computing environment based on determining respective rates of occurrence of the first set of two or more message IDs included in the incoming real-time data data and the second set of two or more message IDs respectively associated with the historical occurrence of the one or more anomalies and determining a relationship between the first set of two or more message IDs included in the incoming real-time data and the second set of two or more message IDs respectively associated with the historical occurrence of the one or more anomalies that precede one or more non-fatal events within the networked computing environment, wherein the determined relationship between the first set of two or more message IDs and the second set of two or more message IDs includes:
(i) determining that the first set of two or more message IDs and the second set of two or more message IDs occur within a defined window of time,
(ii) determining that the first set of message IDs and the second set of message IDs both include at least a first message ID and a second message ID,
(iii) redetermining respective rates of occurrences of at least a second message ID based on a modified window of time in response to determining that a first threshold value corresponding to a first rate of occurrence of a first message ID within the defined window of time is exceeded, and
(iv) determining respective rates of occurrence of the first set of two or more message IDs and the second set of two or more message IDs are above respective thresholds of occurrence values;

program instructions to respond to a determination that the incoming real-time data correlates to the previous anomaly that occurred within the networked computing environment based on the determined relationship between the first set of two or more message IDs included in the incoming real-time data and the second set of two or more message IDs respectively associated with the historical occurrence of the one or more anomalies by determining a first automated response to the anomaly based on accessing a first automated response to the previous anomaly that occurred based on accessing a first network-accessible database that stores a plurality of previously determined responses that correspond to one or more anomalies; and program instructions to initiate the determined first automated response to one or more elements of the networked computing environment to prevent a non-fatal event within the networked computing environment.

8. The computer program product of claim 7, further comprising:
program instructions to identify a structure respectively associated with a message of a plurality of messages within included within the incoming real-time data by accessing a reference library; and program instructions to determine information included within the incoming real-time data based on utilizing the identified structure respectively associated with the message, wherein the determined information respectively associated with the message includes a message ID and one or more elements selected from the group consisting of: a timestamp a response code, a message prefix, a process ID, and state data of an entity associated with a message.

9. The computer program product of claim 7,
wherein a relationship between the second set of two or more message IDs and a corresponding historical occurrence of an anomaly includes:
(i) an order among occurrences of two or more message IDs of the second set of two or more message IDs,
(ii) overlaps between time intervals respectively associated with at least two message IDs, of the second set of two or more message IDs, within the defined window of time, and
(iii) one or more logical conditions related to interactions among at least two message IDs.

10. The computer program product of claim 7, wherein a non-fatal event includes a degradation of performance associated with one or more executing software applications.

11. A computer system for automating responses to manage a networked computing environment, the computer system comprising: one or more computer processors; one or more computer readable storage media; program instructions stored on the computer readable storage media for reading/execution by at least one of the one or more computer processors, the program instructions further comprising:

program instructions to determine that incoming real-time data generated within a networked computing environment includes occurrences of a first set of two or more message identifiers (IDs) that correspond to a second set of two or more message IDs respectively associated with a historical occurrence of one or more anomalies within the networked computing environment;

program instructions to determine that the incoming real-time data correlates to a previous anomaly that occurred within the networked computing environment based on determining respective rates of occurrence of the first set of two or more message IDs included in the incoming real-time data data and the second set of two or more message IDs respectively associated with the historical occurrence of the one or more anomalies and determining a relationship between the first set of two or more message IDs included in the incoming real-time data and the second set of two or more message IDs respectively associated with the historical occurrence of the one or more anomalies that precede one or more non-fatal events within the networked computing environment, wherein the determined relationship between the first set of two or more message IDs and the second set of two or more message IDs includes:
(i) determining that the first set of two or more message IDs and the second set of two or more message IDs occur within a defined window of time,
(ii) determining that the first set of message IDs and the second set of message IDs both include at least a first message ID and a second message ID,
(iii) redetermining respective rates of occurrences of at least a second message ID based on a modified window of time in response to determining that a first threshold value corresponding to a first rate of occurrence of a first message ID within the defined window of time is exceeded, and (iv) determining respective rates of occurrence of the first set of two or more message IDs and the second set of two or more message IDs are above respective thresholds of occurrence values;

program instructions to respond to a determination that the incoming real-time data correlates to the previous anomaly that occurred within the networked computing environment based on the determined relationship between the first set of two or more message IDs included in the incoming real-time data and the second set of two or more message IDs respectively associated with the historical occurrence of the one or more anomalies by determining a first automated response to the anomaly based on accessing a first automated response to the previous anomaly that occurred based on accessing a first network-accessible database that stores a plurality of previously determined responses that correspond to one or more anomalies; and program instructions to initiate the determined first automated response to one or more elements of the networked computing environment to prevent a non-fatal event within the networked computing environment.

12. The computer system of claim 11, further comprising:
program instructions to identify a structure respectively associated with a message of a plurality of messages within included within the incoming real-time data by accessing a reference library; and program instructions to determine information included within the incoming real-time data based on utilizing the identified structure respectively associated with the message, wherein the determined information respectively associated with the message includes a message ID and one or more elements selected from the group consisting of: a timestamp a response code, a message prefix, a process ID, and state data of an entity associated with a message.

13. The computer system of claim 11,
wherein a relationship between the second set of two or more message IDs and a corresponding historical occurrence of an anomaly includes:

(i) an order among occurrences of two or more message IDs of the second set of two or more message IDs, (ii) overlaps between time intervals respectively associated with at least two message IDs, of the second set of two or more message IDs, within the defined window of time, and (iii) one or more logical conditions related to interactions among at least two message IDs.

14. The computer system of claim 11, wherein a non-fatal event includes a degradation of performance associated with one or more executing software applications.

* * * * *